(12) United States Patent
Mentze (10) Patent No.: US 10,581,743 B2
(45) Date of Patent: Mar. 3, 2020

(54) GROUP RATE LIMITERS FOR MULTICAST DATA PACKETS

(71) Applicant: Hewlett Packard Enterprise Development LP, Houston, TX (US)

(72) Inventor: Duane Edward Mentze, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 62 days.

(21) Appl. No.: 15/871,340

(22) Filed: Jan. 15, 2018

(65) Prior Publication Data

US 2019/0222519 A1 Jul. 18, 2019

(51) Int. Cl.
*H04L 12/801* (2013.01)
*H04L 12/823* (2013.01)
*H04L 12/813* (2013.01)

(52) U.S. Cl.
CPC .............. *H04L 47/15* (2013.01); *H04L 47/20* (2013.01); *H04L 47/32* (2013.01)

(58) Field of Classification Search
None
See application file for complete search history.

(56) References Cited

U.S. PATENT DOCUMENTS

| | | | |
|---|---|---|---|
| 6,621,805 B1 | 9/2003 | Kondylis et al. | |
| 7,006,518 B2 | 2/2006 | Ornes et al. | |
| 7,778,194 B1 * | 8/2010 | Yung | H04L 41/0896 370/235 |
| 8,054,744 B1 * | 11/2011 | Bishara | H04L 47/2441 370/229 |
| 8,102,848 B1 | 1/2012 | Rao | |
| 9,032,077 B1 * | 5/2015 | Klein | H04L 29/08 370/395.21 |
| 9,059,925 B2 | 6/2015 | Meier et al. | |
| 9,137,119 B2 | 9/2015 | Yang et al. | |
| 9,306,870 B1 * | 4/2016 | Klein | H04L 29/06176 |
| 10,097,474 B1 * | 10/2018 | Kabbani | H04L 47/41 |
| 2003/0202467 A1 * | 10/2003 | Bruckman | H04L 47/10 370/229 |
| 2003/0225905 A1 * | 12/2003 | Scifres | H04L 47/10 709/234 |
| 2010/0135158 A1 * | 6/2010 | Adams | H04L 47/10 370/235 |

(Continued)

OTHER PUBLICATIONS

"IP Multicast Best Practices for Enterprise Customers," Oct. 2009, pp. 1-13, Cisco.

*Primary Examiner* — Duc T Duong
(74) *Attorney, Agent, or Firm* — Tong, Rea, Bentley & Kim, LLC (57) ABSTRACT

In example implementations, a method is provided. The method detects, by a processor, a change in incoming data packet relative to a previously received data packet. In response to the change, group rate limiters are enabled to the incoming data packets for each one of a plurality of different data packet groups. The group rate limiters stop the incoming data packet when the data packet is assigned to one of the plurality of different data packet groups that has reached a respective group rate limiter. A hardware controller is programmed to forward respective data packets in each one of the plurality of different data packet groups.

20 Claims, 4 Drawing Sheets

(56) References Cited

U.S. PATENT DOCUMENTS

| | | | |
|---|---|---|---|
| 2011/0019551 A1* | 1/2011 | Adams | H04L 43/026 370/235 |
| 2011/0199902 A1* | 8/2011 | Leavy | H04L 43/0876 370/232 |
| 2012/0079101 A1* | 3/2012 | Muppala | H04L 63/0236 709/224 |
| 2012/0127862 A1* | 5/2012 | Madsen | H04L 47/10 370/235 |
| 2014/0153388 A1* | 6/2014 | Webb | H04L 47/20 370/230 |
| 2015/0016255 A1* | 1/2015 | Bisht | H04L 47/11 370/235 |
| 2015/0236968 A1* | 8/2015 | Zhang | H04L 63/1416 370/230 |

\* cited by examiner

GROUP RATE LIMITERS FOR MULTICAST DATA PACKETS

BACKGROUND

Networks are deployed to provide communications between endpoint devices. The networks may include a variety of different components to operate. For example, the network may include routers, switches, gateways, firewalls, and the like. The networks may include different sub-networks such as a core network, an access network, and the like.

The networks may also have different communication protocols. For example, some networks may be unicast (e.g., one to one communications), while other networks may be multicast (e.g., one to many communications). Multicast communication protocols can be used to efficiently transmit data to many different destinations.

DETAILED DESCRIPTION

Examples described herein provide a method for applying group rate limiters to multicast data packets that are processed in routers. As discussed above, networks may have different communication protocols. For example, some networks may use multicast protocols to transmit data to many different destinations.

Examples of multicast protocols may include internet group management protocol (IGMP) snooping, protocol independent multicasting (PIM) sparse mode (SM) or dense mode (DM), and the like. The devices, such as routers, in the multicasting network may have a limited amount of processing capability. When a large amount of data changes occurs on a router, the router may apply a rate limiter.

Currently, a single rate limiter may be applied to the router. For example if a large amount of data changes is detected, a single rate limiter of 500 packets per second may be applied. Thus, if all 500 data packets are part of the same flow, then only a single flow may be configured during a rate limiter time period and all other data packets that may be associated with different flows may be dropped.

The present disclosure provides a group rate limiter for multicast data packets processed by a router that may allow more data packets to be examined and a more diverse set of flows to be configured for forwarding on the router. For example, identifiers associated with each data packet may be organized into groups (e.g., via unique identifiers or a hash function). Each group may be associated with a rate limiter. When the rate limit is reached for a group, any additional packets for that group may be dropped to allow other packets to be examined with the limited processing resources of the router. As a result, even if the first 500 packets are associated with the same flow, the present disclosure may examine the first 50 packets and then drop the next 450 packets to receive another set of packets that are associated with a different flow.

Figure 1:
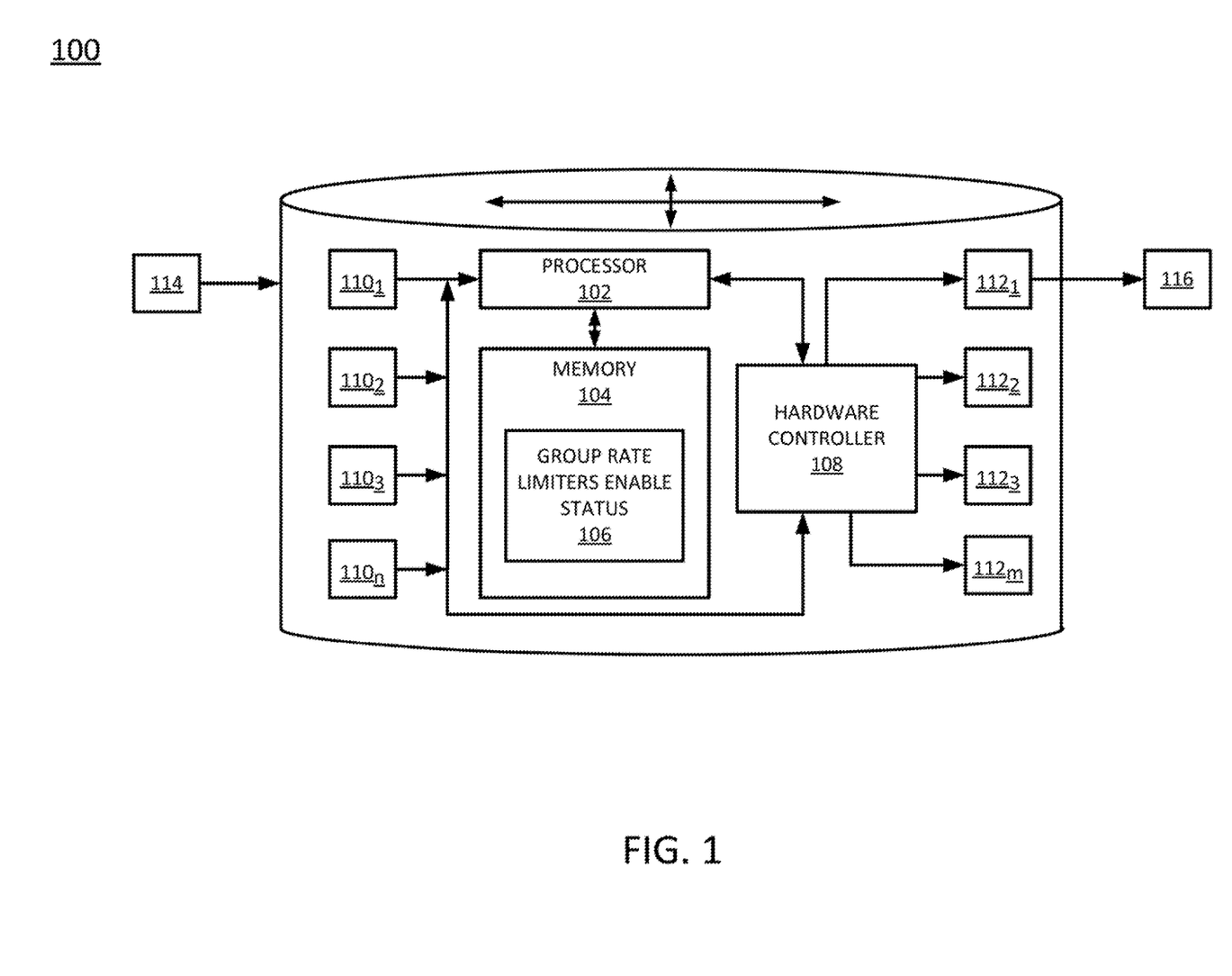
FIG. 1 is a block diagram of an example of an apparatus of the present disclosure.

FIG. 1 illustrates an apparatus 100 of the present disclosure. In one example, the apparatus 100 may be a router, a switch, or a combination of a router and a switch, in a communication network. The apparatus 100 may be communicatively coupled to other network devices within the communication network (not shown). For example, the apparatus 100 may be communicatively coupled to another router, another switch, a gateway, a firewall, a centralized network controller, and the like.

In one example, the apparatus 100 may be programmed to forward, transport, or communicate multicast data packets. For example, the apparatus 100 may communicate with other routers, switches, and the like, using a multicast communication protocol such as a protocol independent multicast (PIM) protocol (sparse mode or dense mode) or an Internet group management protocol (IGMP).

In one example, the apparatus 100 may include a processor 102, a memory 104, and a hardware controller 108. The processor 102 may be communicatively coupled to the memory 104 and the hardware controller 108. The memory 104 may be a non-transitory computer readable medium such as a hard disk drive, a random access memory (RAM), a read only memory (ROM), and the like. In one example, the memory 104 may store a group rate limiters enable status 106 and all of the attributes associated with enabling the group rate limiters, as discussed in further detail below.

In one example, the hardware controller 108 may be a physical device or processing device that can hardware forward an incoming data packet 114. For example, the hardware controller 108 may be configured with forwarding rules to forward the incoming data packet 114. In one example, the hardware controller 108 may be an application specific integrated controller (ASIC).

In one example, the processor 102 may also forward the incoming data packet 114. However, the processor 102 may perform software forwarding of the incoming data packets 114 when the hardware controller 108 is being reprogrammed for new forwarding rules. For example, the hardware controller 108 may be reprogrammed in response to a detected change in the incoming packet 114 relative to previously received incoming packets 114, as discussed in further details below.

In one example, the processor 102 and the hardware controller 108 may be communicatively coupled to interfaces $110_1$ to $110_n$ (hereinafter referred to individually as an interface 110 or collectively as interfaces 110). The interfaces 110 may be incoming interfaces. In other words, the incoming data packet 114 may arrive at the apparatus 100 via one of the interfaces 110.

The hardware controller 108 may be communicatively coupled to interfaces $112_1$ to $112_m$ (hereinafter referred to individually as an interface 112 or collectively as interfaces 112). The processor 102 may be also communicatively coupled to the interfaces 112 (e.g., directly or indirectly via the hardware controller). The interfaces 112 may be outgoing interfaces. In other words, an outgoing data packet 116 may exit the apparatus 100 via one of the interfaces 112. Thus the incoming data packet 114 may be software forwarded via the processor 102 or hardware forwarded by the hardware controller 108 without being processed by the processor 102.

Although FIG. 1 illustrates a single incoming data packet 114 and a single outgoing data packet 116, it should be noted that a plurality of different incoming data packets 114 may be received via different data streams (e.g., data streams from different multicast sources) on the different interfaces 110. In addition, the outgoing data packet 116 may be a plurality of different outgoing data packets 116 that may be transmitted on the different interfaces 112. The incoming data packet 114 and the outgoing data packet 116 may be in a format associated with multicast transmission protocols.

As noted above, the processor 102 may enable the group rate limiters enable status 106 stored in memory 104 when a change is detected. The change may be a change relative to a previously received incoming data packet 114. For example, the change may be a new flow of incoming data packets 114 caused by a change in a source Internet protocol (IP) address, a destination IP address, or a virtual routing function identification (VRF ID) relative to a previously received data packet 114, or a change in an interface 110 that the incoming data packet 114 is received on, and so forth.

Figure 2:
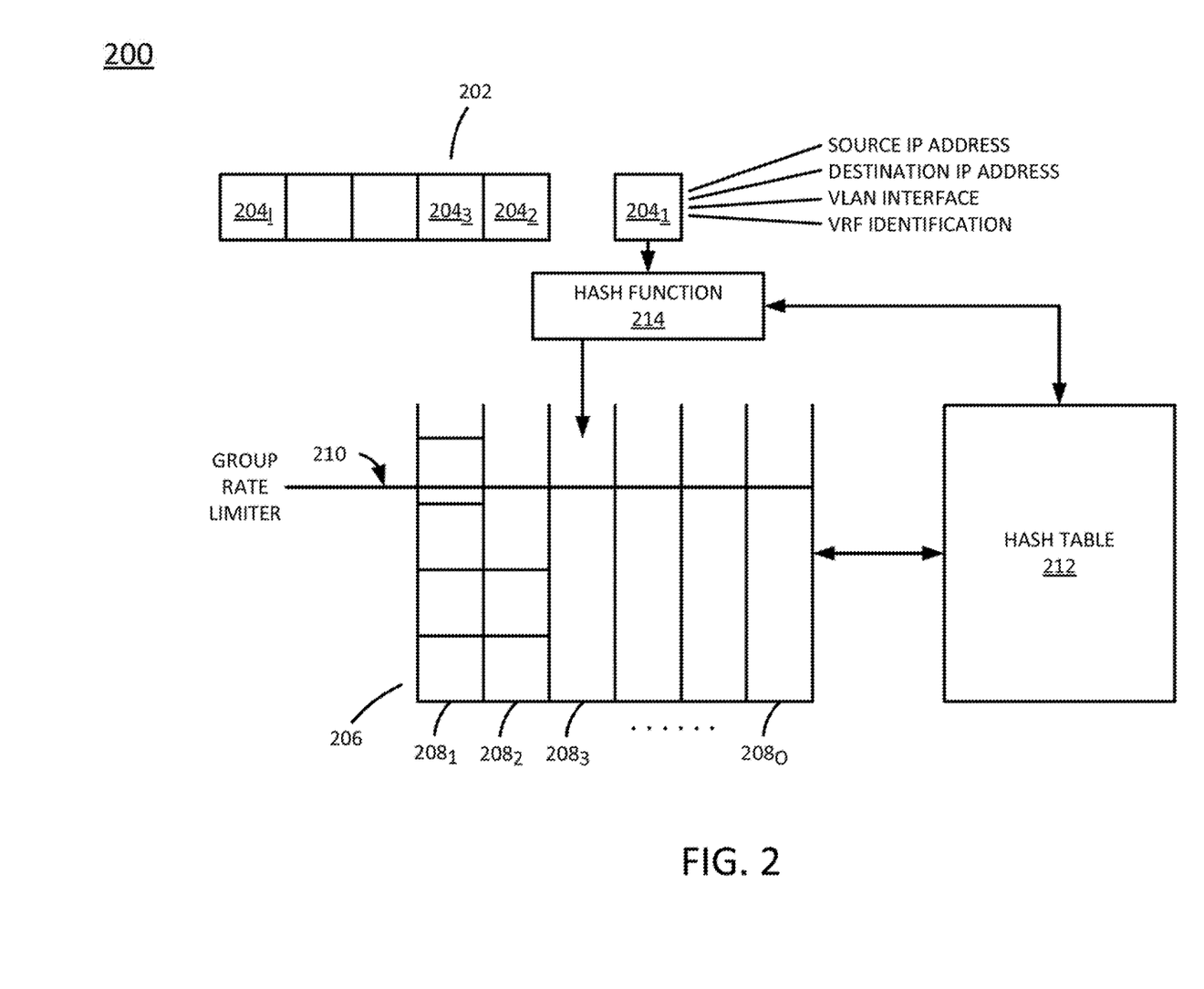
FIG. 2 is another block diagram of an example of different data packet groups with group rate limiters of the present disclosure.

FIG. 2 illustrates an example of a visual representation of how the group rate limiters enable status 106 is enabled. In one example, the group rate limiters may be controlled by the processor 102 or the hardware controller 108.

In one example, when the change is detected, the apparatus 100 may examine an incoming stream 202 of data packets $204_1$ to $204_i$ (also referred to herein individually as a data packet 204 or collectively as data packets 204). The data packets 204 may be received via one of the interfaces 110 of the apparatus 100.

In one example, each data packet 204 may include attributes associated with the data packet. For example, the attributes may include a source IP address, a destination IP address, a virtual local area network (VLAN) interface, a VRF ID, and the like. The attributes associated with each data packet 204 may be used to assign (e.g., via a unique combination of the information or by using a hash function, as discussed below) the data packet 204 to one of the unique groups or data packet groups $208_1$ to $208_o$ (hereinafter also referred to individually as a group 208 or collectively as groups 208) of a table 206. The table 206 may include bins for each one of the groups 208 that a data packet 204 can be assigned to. It should be noted that the table 206 and the groups 208 may be stored in the memory 104 of the apparatus 100 and pre-defined.

The number of unique groups 208 included in the table 206 may be a number that is sufficient to see data packets 204 from a variety of different streams, but at the same time not consume the processing and memory resources of the apparatus 100. In other words, the number of unique groups 208 may be a function of the amount of processing resources and memory available on the apparatus 100. For example, too small of a number of groups 208 and the benefit of using the table 206 may be minimized. Too large of a number of groups 208 and the amount of processing and memory resources consumed to examine each different group 208 and program the forwarding rule for each group 208 on the hardware controller 108 may be taxing on the apparatus 100.

In one example, the number of groups 208 may be a predefined number. For example, the apparatus 100 may be set to include the first 20, 50, or 100 unique groups that are detected.

In one example, each one of the groups 208 may be identified by a unique combination of the source IP address, the destination IP address, the VLAN interface and the VRF ID. In another example, each one of the groups 208 may be identified using a hash function 214. The hash function 214 may apply a computation to the attributes associated with the data packet 204 and determine one of the groups 208. In one example, a hash table 212 may have a column for each group 208 and a value for each column may contain a current count for that particular group 208. The hash function 214 and the hash table 212 may also be stored in the memory 104. The hash table 212 may track which groups are associated with which abbreviated binary representation computed by the hash function 214. For example, the destination IP address may be comprised of 32 binary bits. However, the last four binary bits may be used to track 16 unique groups (e.g., $2^4$ combinations). The hash table 212 may track which sequence of bits is associated with which group of data packets 204 having a particular destination IP address.

The above example has been simplified using the destination IP address. The hash function 214 may map the data packets 204 into one of the groups 208. The hash function 214 may utilize some or all attributes of the data packet 204 in order to distribute the data packets 204 more evenly across the groups 208. Example attributes which may be used in the hash function may include the source IP address, the destination IP address, the VLAN interface, and the VRF ID.

In one example, each group 208 may have a respective group rate limiter 210. In one example, the group rate limiter 210 may be associated with an overall rate limiter. For example, an overall rate limiter may also be applied with the group rate limiters 210 stored in the memory 104 when a change is detected. Thus, if the overall rate limiter is five hundred packets and 20 unique groups 208 are tracked in the table 206, then each group rate limiter 210 may be twenty five packets.

In another example, each group may have a different respective group rate limiter 210. For example, the group $208_1$ may have a respective group rate limiter 210 of fifty packets, the group $208_2$ may have a respective group rate limiter 210 of twenty five packets, and so forth.

When a data packet 204 is assigned to a group 208 that has exceeded the group rate limiter 210, the data packet 204 may be discarded. In one example, when a data packet 204 is assigned to a group 208 that has not exceeded the group rate limiter 210, then the data packet 204 may be assigned to the group 208 and a counter of data packets for that group 208 may be incremented.

In one example, the data packet 204 may be assigned to the group 208 if the respective group rate limiter 210 is not exceeded and the overall rate limiter is also not exceeded. For example, the overall rate limiter may be five hundred data packets. An incoming data packet $204_1$ may be assigned to group $208_2$ based on an examination of the attributes associated with the data packet $204_1$. The group $208_2$ may be under the respective group rate limiter 210. However, there may already be five hundred data packets that have been assigned total in all of the groups 208 of the table 206. As a result, the incoming data packet $204_1$ may still be dropped or discarded.

In another example, the data packet 204 may be assigned to a group 208 that does not have any data packets 204. In other words, the data packet 204 may be the first data packet assigned to a particular group 208. As a result, the processor 102 may begin programming forwarding rules for the particular group 208 in the hardware controller 108.

In one example, the processor 102 may software forward each data packet 204 that is examined and successfully assigned to a group 208 until the forwarding rules for that group 208 are programmed into the hardware controller. In other words, the processor 102 may software forward the data packets 204 while programming new forwarding rules onto the hardware controller 108 for each group $208_1$ to $208_o$.

As result, using the group rate limiters 210 may allow the apparatus 100 to examine and forward a larger variety of data packets 204. For example, using previous methods that employed an overall rate limiter (e.g., five hundred data packets), only a single data stream may be examined. For example, if the incoming data stream 202 had five hundred data packets 204 with the same attributes (e.g., the same source IP address, the same destination IP address, the same VLAN interface, and the same VRF ID), only a single data stream would be forwarded.

However, using the group rate limiter 210, or the group rate limiter 210 in combination with the overall rate limiter, of the present disclosure, a larger variety of different incoming data streams 202 may be examined. For example, if the group rate limiter 210 were twenty five for each group 208, the first twenty five data packets 204 of the five hundred data packets 204 in a particular incoming data stream 202 may be examined, assigned to group $208_1$ and forwarded. After twenty five data packets 204 are assigned to group $208_1$, the group rate limiter 210 may be exceeded and the remaining 475 data packets 204 of the incoming data stream 202 may be dropped.

Subsequently, a new data stream 202 of fifty data packets 204 may be received. The first twenty five data packets 204 may be assigned to group $208_2$ and forwarded. The remaining twenty five data packets 204 may be dropped or discarded. Another new data stream 202 of 200 data packets 204 may be received. The first twenty five data packets 204 may be assigned to group $208_3$ and forwarded. The remaining 175 data packets 204 may be dropped or discarded. The process may be repeated until the overall rate limiter of five hundred data packets is reached. Thus, with the present disclosure a larger variety of data packets 204 from different data streams 202 may be examined and forwarded.

Figure 3:
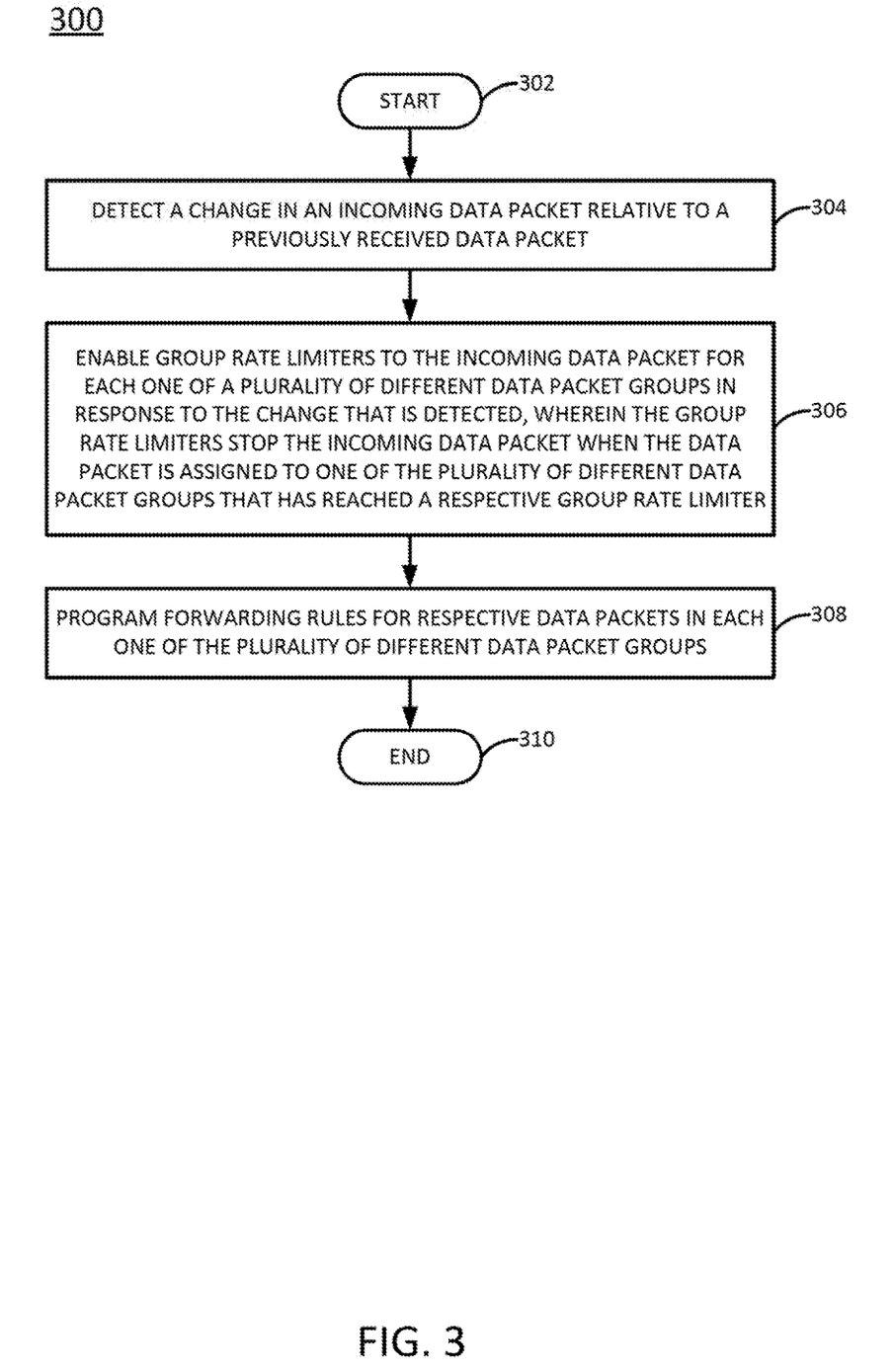
FIG. 3 is a flow chart of an example method for enabling group rate limiters while programming forwarding rules for an incoming data packet.

FIG. 3 illustrates a flow diagram of an example method 300 for enabling group rate limiters while programming forwarding rules for an incoming data packet. In one example, the method 300 may be performed by the apparatus 100 or the apparatus 400 illustrated in FIG. 4 and described below.

At block 302, the method 300 begins. At block 304, the method 300 detects a change in an incoming data packet relative to a previously received data packet. The data packet may be a multicast data packet. In other words, the data packet may be transmitted and forwarded using multicast communication protocols.

In one example, the change may be detected based on a change of attributes associated with the incoming data packet relative to a previously received data packet. For example, the incoming data packet may have a new source IP address or arrive at a different interface on the router or switch than the previously received data packets. In another example, the change may be that the incoming data packet has a new source IP address (e.g., a new data stream is started from a multicasting source).

In one example, the change may be detected by the router or the switch. For example, the router may monitor which interfaces are receiving data packets. When a data packet arrives on an interface that was not receiving data packets, the router may detect a change. In another example, the router may examine each packet that arrives to determine the source IP address, the destination IP address, the VLAN interface and the VRF ID. When the source IP address, the destination IP address, the VLAN interface or the VRF ID is different on the incoming data packet compared to previously received data packets, the router may detect a change.

At block 306, the method 300 enables group rate limiters to the incoming data packet for each one of a plurality of different data packet groups in response to the change that is detected, wherein the group rate limiters stop the incoming data packet when the data packet is assigned to one of the plurality of different data packet groups that has reached a respective group rate limiter. For example, when the change is detected, new forward rules may be programmed on the hardware controller. However, to prevent overwhelming the processing and memory resources of the router or switch, the data packets may be rate limited.

Moreover, to increase the likelihood that data packets from a variety of different data streams are examined and forwarded, the method 300 may use group rate limiters rather than an overall rate limiter. For example, the method 300 may examine each incoming data packet and assign the data packet to a unique group. The group may be based on a unique combination of the attributes associated with the data packet (e.g., the source IP address, the destination IP address, the VLAN interface and the VRF ID). In another example, the group may be based on hash function where an association of each hash abbreviation is stored in a hash table.

The number of data packets in each group can be monitored to determine if a respective group rate limiter is exceeded. For example, each unique group may have a respective group rate limiter. The group rate limiter for each unique group may be the same value or a different value.

When a data packet is assigned to a particular group and the respective group rate limiter is reached, the data packet may be discarded. Otherwise, if the respective group rate limiter is not reached, the data packet may be assigned to the particular group and a data packet count for the particular group may be incremented.

In one example, even if the respective group rate limiter is not reached, but the overall rate limiter is reached, the data packet may be discarded. For example, five hundred packets may be assigned to one of fifty different data packet groups. The next data packet may be assigned to a data packet group that is still below the respective group rate limiter, but may be discarded since the overall rate limiter has been exceeded.

At block 308, the method 300 programs forwarding rules for respective data packets in each one of the plurality of different data packet groups. In one example, the forwarding rules may be programmed when a data packet is the first data packet to be assigned to a particular group. For example, the method 300 may determine whether the incoming data packet is the first data packet assigned to a particular data packet group. If the incoming data packet is the first data packet, then the method 300 may begin programming the forwarding rules in the hardware controller for the data packets in the particular data packet group.

In one example, after each one of the plurality of different data packet groups have the forwarding rules implemented in the hardware controller, the method 300 may begin hardware forwarding the respective data packets in each data packet group. The group rate limiters may then be disabled until another change is detected, as described above.

Thus, by enabling the group rate limiters of the present disclosure, data packets from a larger variety of different data streams may be examined and hardware forwarded when a change is detected. With a larger variety of different data streams examined, the likelihood of detecting another change is reduced. This may reduce the overall time to detect and program changes when a large number of changes happen. The previous methods may take longer with more cycles of maxing out the rate limiter and waiting for the next time period. At block 310, the method 300 ends.

Figure 4:
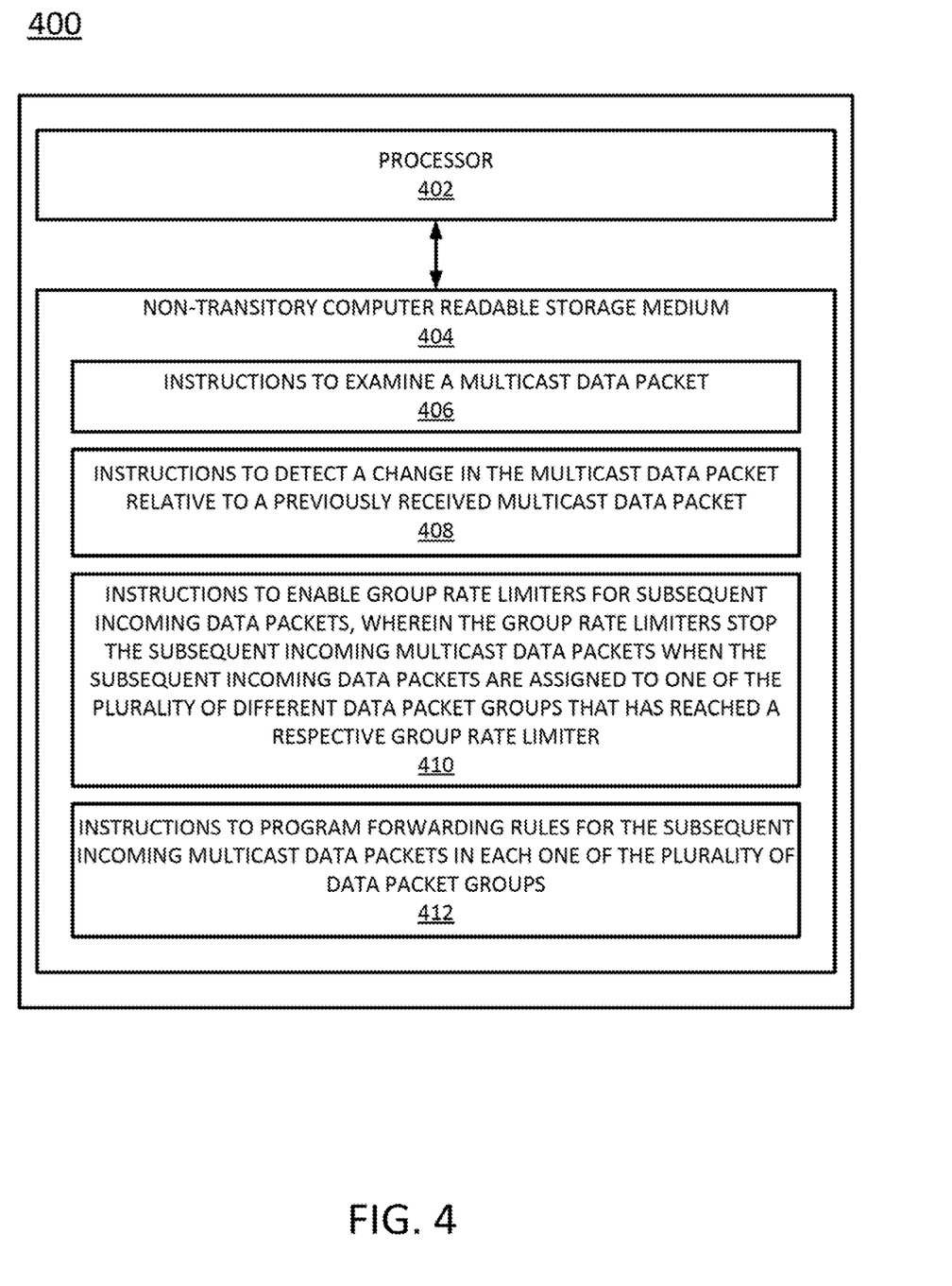
FIG. 4 is a block diagram of an example non-transitory computer readable storage medium storing instructions executed by a processor.

FIG. 4 illustrates an example of an apparatus 400. In one example, the apparatus 400 may be the apparatus 100. In one example, the apparatus 400 may include a processor 402 and a non-transitory computer readable storage medium 404. The non-transitory computer readable storage medium 404 may include instructions 406, 408, 410, and 412 that, when executed by the processor 402, cause the processor 402 to perform various functions.

In one example, the instructions 406 may include instructions to examine a multicast data packet. The instructions 408 may include instructions to detect a change in the multicast data packet relative to a previously received multicast data packet. The instructions 410 may include instructions to enable group rate limiters for subsequent incoming multicast data packets, wherein the group rate limiters stop the subsequent incoming multicast data packets when the subsequent incoming data packets are assigned to one of the plurality of different data packet groups that has reached a respective group rate limiter. The instructions 412 may include instructions to program forwarding rules for the subsequent incoming multicast data packets in each one of the plurality of data packet groups.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
   detecting, by a processor, a change in an incoming data packet relative to a previously received data packet;
   enabling, by the processor, group rate limiters to the incoming data packet for each one of a plurality of different data packet groups in response to the change that is detected, wherein the group rate limiters stop the incoming data packet when the data packet is assigned to one of the plurality of different data packet groups that has reached a respective group rate limiter, wherein the enabling comprises:
      examining, by the processor, the incoming data packet; and
      assigning, by the processor, the incoming data packet to one of the plurality of different data packet groups;
   programming, by the processor, forwarding rules for respective data packets in each one of the plurality of different data packet groups; and
   determining, by the processor, whether the incoming data packet is a first data packet that is assigned to the one of the plurality of different data packet groups.

2. The method of claim 1, wherein the change comprises a new flow of incoming data packets or the incoming data packets arriving on a different interface.

3. The method of claim 1, wherein the programming is performed when the incoming data packet is the first data packet that is assigned to the one of the plurality of different data packet groups.

4. The method of claim 1, further comprising:
   determining, by the processor, whether the respective group rate limiter is reached for the one of the plurality of different data packet groups when the incoming data packet is not the first data packet that is assigned to the one of the plurality of different data packet groups.

5. The method of claim 4, wherein the incoming data packet is discarded when the respective group rate limiter is reached.

6. The method of claim 4, wherein a packet count for the one of the plurality of different data packet groups is incremented when the respective group rate limiter is not reached.

7. The method of claim 1, wherein the examining comprises:
   identifying, by the processor, a source Internet protocol (IP) address, a destination IP address, a virtual local area network (VLAN) interface, and a virtual routing and forwarding (VRF) identification (ID).

8. The method of claim 7, wherein the plurality of different data packet groups are based on a pre-defined number of unique combinations of the source IP address, the destination IP address, the VLAN interface, and the VRF ID.

9. The method of claim 7, wherein the plurality of different data packet groups comprise a hash table of a pre-defined number of bins.

10. A non-transitory computer readable storage medium encoded with instructions executable by a processor, the non-transitory computer-readable storage medium comprising:
    instructions to examine a multicast data packet;
    instructions to detect a change in the multicast data packet relative to a previously received multicast data packet;
    instructions to enable group rate limiters for subsequent incoming multicast data packets, wherein the group rate limiters stop the subsequent incoming multicast data packets when the subsequent incoming data packets are assigned to one of the plurality of different data packet groups that has reached a respective group rate limiter, wherein the instructions to enable comprise:
       instructions to enable an overall rate limiter in addition to the group rate limiters;
       instructions to examine each data packet of the incoming subsequent incoming multicast data packets; and
       instructions to assign the each data packet to one of the plurality of different data packet groups if a respective group rate limiter and the overall rate limiter are not exceeded; and
    instructions to program forwarding rules for the subsequent incoming multicast data packets in each one of the plurality of data packet groups.

11. The non-transitory computer readable storage medium of claim 10, wherein the change comprises a new flow of multicast data packets or the multicast data packet arrives on a different interface.

12. The non-transitory computer readable storage medium of claim 10, wherein the instructions to examine comprise:
    instructions to identify a source Internet protocol (IP) address, a destination IP address, a virtual local area network (VLAN) interface, and a virtual routing and forwarding (VRF) identification (ID).

13. The non-transitory computer readable storage medium of claim 12, wherein the plurality of different data packet groups are based on a pre-defined number of unique combinations of the source IP address, the destination IP address, the VLAN interface, and the VRF ID.

14. The non-transitory computer readable storage medium of claim 12, wherein the plurality of different data packet groups comprise a hash table of a pre-defined number of bins.

15. The non-transitory computer readable storage medium of claim 10, further comprising:
  instructions to monitor a respective group rate limiter for the each one of the plurality of data packet groups; and
  instructions to discard data packets of the incoming subsequent multicast data packets that are assigned to one of the plurality of data packet groups that have reached the respective group rate limiter.

16. An apparatus, comprising:
  a plurality of interfaces;
  a hardware controller to forward data packets that arrive on the plurality of interfaces;
  a memory to store a respective group rate limiter for each one of a plurality of different data packet groups when a group rate limiting mechanism is enabled, wherein the group rate limiting mechanism enables group rate limiters to the incoming data packet for each one of a plurality of different data packet groups in response to the change that is detected; and
  a processor communicatively coupled to the plurality of interfaces, the hardware controller, and the memory, the processor to detect a change to the data packets that are arriving relative to a previously received data packet, enable the group rate limiting mechanism, program the hardware controller to forward respective data packets in each one of the plurality of different data packet groups, and determine whether the incoming data packet is a first data packet that is assigned to the one of the plurality of different data packet groups, wherein the group rate limiters stop the incoming data packet when the data packet is assigned to one of the plurality of different data packet groups that has reached a respective group rate limiter, and enabling the group rate limiting mechanism comprises:
    examining, by the processor, the incoming data packet; and
    assigning, by the processor, the incoming data packet to one of the plurality of different data packet groups.

17. The apparatus of claim 16, wherein the hardware controller comprises an application specific integrated controller (ASIC) that is programmed with a new rule for a new flow of data packets in the plurality of different data packet groups.

18. The apparatus of claim 16, the processor to:
  determine whether the respective group rate limiter is reached for the one of the plurality of different data packet groups when the incoming data packet is not the first data packet that is assigned to the one of the plurality of different data packet groups.

19. The apparatus of claim 18, wherein the incoming data packet is discarded when the respective group rate limiter is reached.

20. The apparatus of claim 18, wherein a packet count for the one of the plurality of different data packet groups is incremented when the respective group rate limiter is not reached.

* * * * *